United States Patent
Ma et al.

(10) Patent No.: US 7,552,524 B2
(45) Date of Patent: Jun. 30, 2009

(54) METHOD FOR PREVENTING TMR MRR DROP OF A SLIDER

(75) Inventors: Hongtao Ma, DongGuan (CN); Hongxin Fang, DongGuan (CN); Baohua Chen, DongGuan (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 364 days.

(21) Appl. No.: 11/434,518

(22) Filed: May 16, 2006

(65) Prior Publication Data

US 2008/0000075 A1   Jan. 3, 2008

(51) Int. Cl.
*G11B 5/127* (2006.01)
*H04R 31/00* (2006.01)

(52) U.S. Cl. ............... 29/603.16; 29/603.07; 29/603.12; 29/603.13; 29/603.15; 29/603.18; 360/235.7; 360/235.8; 360/236.3; 360/236.5; 360/237

(58) Field of Classification Search ............... 29/603.03, 29/603.04, 603.06; 360/235.7, 235.8, 236.3, 360/236.5, 236.6, 237

See application file for complete search history.

(56) References Cited

U.S. PATENT DOCUMENTS 6,687,976 B1 * 2/2004 Koyama et al. .......... 29/603.12
7,148,072 B2 * 12/2006 Fontana et al. ................. 438/3

* cited by examiner

*Primary Examiner*—Paul D Kim
(74) *Attorney, Agent, or Firm*—Nixon & Vanderhye P.C.

(57) ABSTRACT

A method for preventing TMR (tunnel magneto-resistance) MRR (magneto-resistance resistance) drop of a slider, comprises steps of: positioning a row bar constructed by a plurality of slider structural bodies on a tray, each slider body having a pole tip with a TMR element; loading the tray into a processing chamber and evacuating the processing chamber to a preset pressure; introducing a processing gas containing oxygen gas into the processing chamber; and exposing the slider structural bodies to an etching means in the atmosphere of the processing gas to oxidize a surface of the TMR element to form an oxidation layer thereon. The invention also discloses a method for forming micro-texture on a surface of slider in same process, and a method for forming such a slider.

3 Claims, 21 Drawing Sheets

METHOD FOR PREVENTING TMR MRR DROP OF A SLIDER

FIELD OF THE INVENTION

The present invention relates to a method for preventing TMR (tunnel magneto-resistance) MRR (magneto-resistance resistance) drop of slider and micro-texture forming method in same process.

BACKGROUND OF THE INVENTION

One known type of information storage device is a disk drive device that uses magnetic media to store data and a movable read/write head that is positioned over the media to selectively read from or write to the disk.

FIG. 1a illustrates a typical disk drive unit 2 and shows a magnetic disk 201 mounted on a spindle motor 202 for spinning the disk 201. A voice coil motor arm 204 carries a head gimbal assembly (HGA) 200 that includes a slider 203 incorporating a read/write head and a suspension 213 to support the slider 203. A voice-coil motor (VCM) 209 is provided for controlling the motion of the motor arm 204 and, in turn, controlling the slider 203 to move from track to track across the surface of the disk 201, thereby enabling the read/write head to read data from or write data to the disk 201. In operation, a lift force is generated by the aerodynamic interaction between the slider 203, incorporating the read/write head, and the spinning magnetic disk 201. The lift force is opposed by equal and opposite spring forces applied by the suspension 213 of the HGA 200 such that a predetermined flying height above the surface of the spinning disk 201 is maintained over a full radial stroke of the motor arm 204.

FIG. 1b shows a perspective view of a slider shown in FIG. 1a, and FIG. 1c shows a top plan view of the slider of FIG. 1b. As illustrated, the slider 203 comprises a leading edge 219 and a trailing edge 218 opposite to the leading edge 219. A plurality of electrical connection pads 215, for example four electrical connection pads are provided on the trailing edge 218 for electrically connecting the slider 203 to the suspension 213 (as shown in FIG. 1a). The trailing edge 218 also comprises a pole tip 216 incorporating a magnetic read/write head on its central position for achieving data reading/writing operation of the slider 203 with respect to the disk 201. The pole tip 216 is formed on the trailing edge 218 by suitable manner such as deposition. In addition, an air bearing surface pattern 217 is formed on one surface of the slider 203 perpendicular to the trailing edge 218 and the leading edge 219.

As shown in FIG. 1d, the pole tip 216 has a layered structure and comprises from top to bottom a second inductive write head pole 116, a first inductive write head pole 118 spacing away from the second inductive write head pole 116, a second shielding layer 111 and a first shielding layer 113. All above components are carried on a ceramic substrate 122 that is used for controlling flying height of the slider. A magneto-resistive element (MR element) 112, along with a lead layer 114, which is disposed at two sides of the magneto-resistive element 112 and electrically connected to the magneto-resistive element 112, is provided between the second shielding layer 111 and first shielding layer 113. Referring to FIG. 1e, coils such as copper coils 117 are provided between the first inductive write head pole 118 and the second inductive write head pole 116 for assisting in writing operation. In addition, an overcoat 115 consisting of a silicon layer 12 and a diamond-like carbon (DLC) layer 13 disposed on the silicon layer 12 (refer to FIG. 1f) is covered on surface of the pole tip and surface of the substrate of the slider to protect the slider.

Presently, in structure of above slider, a GMR (giant magneto-resistance) element is used as the MR element to achieve reading operation. However, with continuously increasing demand of larger areal density of a hard disk drive (HDD), currently used GMR element has almost gotten to its extreme limitation to further improve areal density of the HDD, as a result, a new MR element, i.e., a TMR (tunnel magneto-resistance) element, which can achieve more higher areal density than a GMR element, is developed as the next generation of the read sensor of a HDD.

Referring to FIG. 1f, a conventional TMR element 10 comprises two metal layers 11 and a TMR barrier layer 14 sandwiched between the two metal layers 11. An overcoat 115 consisting of a silicon layer 12 and a diamond-like carbon (DLC) layer 13 disposed on the silicon layer 12 is covered on surface of the metal layers 11 and the TMR barrier layer 14 to protect the TMR element 10.

In manufacturing process of a slider, the Magneto-Resistance Resistance (MRR) value of the TMR element must be controlled to a predetermined value so as to maintain good dynamic performance for the slider. For example, in lapping process of the slider, the MR height of the TMR element should be precisely lapped in order to adjust the MR height to a designed value, as the MR height greatly affects the MRR value, thus further affects dynamic performance of the slider and HDD. Take another example, in vacuum process of the slider, the MR height should be kept constant all the time so that the MRR is unchanged.

However, in conventional TMR element structure, since metal layers are in direct contact with the silicon layer of the overcoat, metal material of the metal layers readily diffuses into surface of the silicon layer, and the metal material diffused into the silicon layer functions as an electrically conductive lead, which electrically connects the two metal layers of the TMR element together, thus a shunting path for circuitry of the TMR element being formed between the two metal layers via the metal material diffused into the silicon layer. Unfortunately, this shunting path causes reduction of the MRR value of the TMR element, and consequently degrades dynamic performance of the slider and even read performance of the HDD. It is proved by experiment that after the overcoat is covered on the surface of the TMR element in a vacuum process, the MRR drop thereof is about 4%, and sometime the MRR drop can be dramatically 10%, which is fatal for process control and dynamic performance control of the slider.

Thus, there is a need for an improved system and method that does not suffer from the above-mentioned drawbacks.

SUMMARY OF THE INVENTION

One aspect of the invention is to provide a method for preventing TMR MRR drop of a slider, which can effectively prevent MRR drop of a TMR element of a slider, thus improving dynamic performance of the slider and further improving reading performance of a HDD having the slider.

Another aspect of the invention is to provide a method for forming micro-texture on a surface of a slider, which can clearly improve touch-down and take-off performance of the slider.

To achieve above object, a method for preventing TMR MRR drop of slider is provided, which comprise steps of: positioning a row bar constructed by a plurality of slider structural bodies on a tray, each slider structural body having a pole tip with a TMR element; loading the tray into a processing chamber and evacuating the processing chamber to a preset pressure; introducing a processing gas containing oxygen gas into the processing chamber; and exposing the slider structural bodies to an etching means in the atmosphere of the processing gas to oxidize a surface of the TMR element to form an oxidation layer thereon.

In one embodiment of the invention, the TMR element comprises two metal layers and a barrier layer disposed between the two metal layers, and the oxidation layer is formed on the two metal layers.

In another embodiment of the invention, the oxidation layer has a thickness ranging between 1.5 nm and 4 nm, and a thickness of 2 nm is preferable.

A method for forming micro-texture on a surface of a slider, comprises steps of: positioning a row bar constructed by a plurality of slider structural bodies on a tray, each slider structural body having a pole tip with a TMR element; loading the tray into a processing chamber and evacuating the processing chamber to a preset pressure; introducing a processing gas containing oxygen gas into the processing chamber; exposing the sliders bodies to an etching means in the atmosphere of the processing gas to form an oxidation layer on a surface of each TMR element and forming a two-step structure on a surface of each slider structural body not covered by the oxidation layer; forming a silicon layer on the surface of the slider structural body and the surface of the TMR element; and forming a DLC layer on the silicon layer.

In one embodiment of the invention, the processing gas is a mixture of oxygen and at least one noble gas. In another embodiment of the invention, the processing gas is pure oxygen.

Preferably, a step of lapping the surface of the slider before positioning the row bar on the tray may also be included in the micro-texture forming method, and a step of shielding the pole tip with a photo-resist mask before introducing the processing gas containing oxygen gas into the processing chamber may also be added in. The photo-resist mask may be a positive photo resist or a negative photo resist.

Furthermore, the etching means may comprise plasma or ion beam. In one embodiment of the invention, the plasma is directly capacitance coupled plasma or inductive coupled plasma. In another embodiment of the invention, the plasma is generated by an electro-cyclotron resonance enhanced microwave source.

A method for manufacturing a slider, comprising steps of: positioning a row bar constructed by a plurality of slider structural bodies on a tray, each slider structural body having a pole tip with a TMR element; loading the tray into a processing chamber and evacuating the processing chamber to a preset pressure; introducing a processing gas containing oxygen gas into the processing chamber; exposing the slider structural bodies to an etching means in the atmosphere of the processing gas to form an oxidation layer on a surface of each TMR element and forming a two-step structure on a surface of each slider structural body; forming a silicon layer on the surface of the slider structural body and the surface of each TMR element; forming a DLC layer on the silicon layer; and cutting the row bar into individual sliders.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective view of a slider shown in FIG. 1a;

FIG. 6b shows a depth distribution status of the slider surface shown in FIG. 6a;

FIG. 7b shows a micro-texture depth distribution status of the slider surface shown in FIG. 7a;

FIG. 8b shows a micro-texture depth distribution status of the slider surface shown in FIG. 8a;

FIG. 9b shows a micro-texture depth distribution status of the slider surface shown in FIG. 9a;

FIG. 10b shows a micro-texture depth distribution status of the slider surface shown in FIG. 10a;

DETAILED DESCRIPTION OF ILLUSTRATED EMBODIMENTS

Figure 1A:
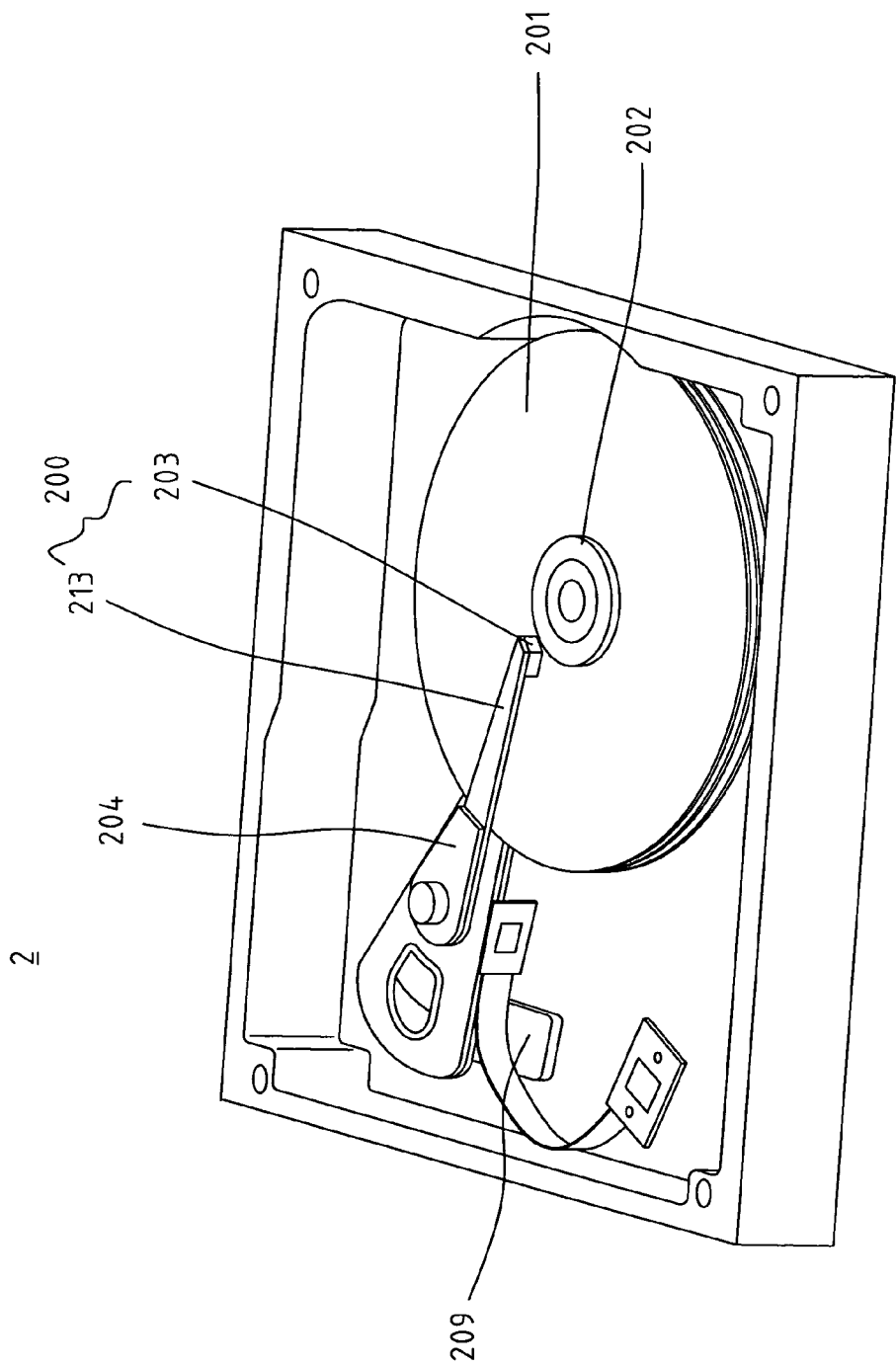
FIG. 1a is a perspective view of a conventional disk drive unit.
Figure 1B:
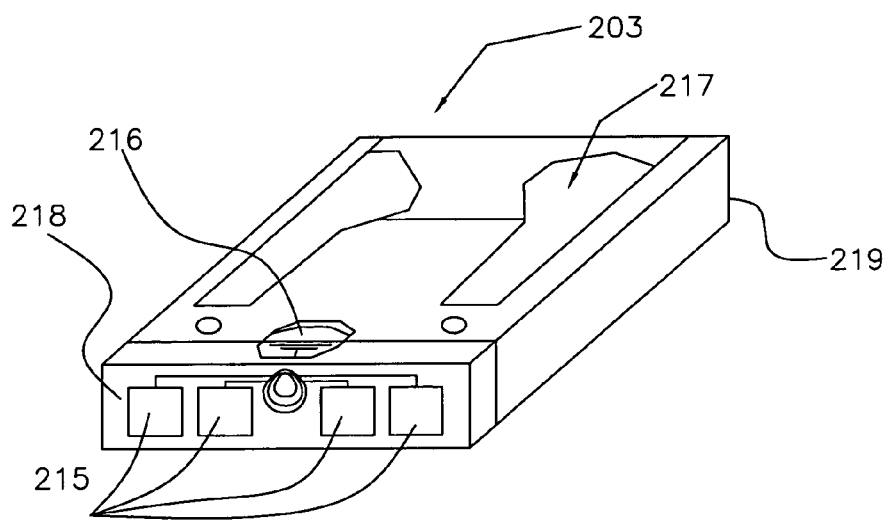

Various preferred embodiments of the instant invention will now be described with reference to the figures, wherein like reference numerals designate similar parts throughout the various views. The invention provides a method for preventing TMR MRR drop of a slider, comprising the steps of: positioning a row bar constructed by a plurality of slider structural bodies on a tray, each slider structural body having a pole tip with a TMR element; loading the tray into a processing chamber and evacuating the processing chamber to a preset pressure; introducing a processing gas containing oxygen gas into the processing chamber; and then exposing the slider structural bodies to an etching means in the atmosphere of the processing gas to oxidize a surface of the TMR element to form an oxidation layer thereon. By forming an oxidation layer that functions as a barrier layer to isolate the metal layers of the TMR element and the silicon layer, diffusion of metal material of the metal layers into the silicon layer is prevented. Correspondingly, shunting path of circuitry of the TMR element will not be formed, and finally MRR of the TMR element is kept unchanged all the time during slider manufacturing process, thus greatly improving dynamic performance of the slider and read performance of the HDD.

Figure 2A:
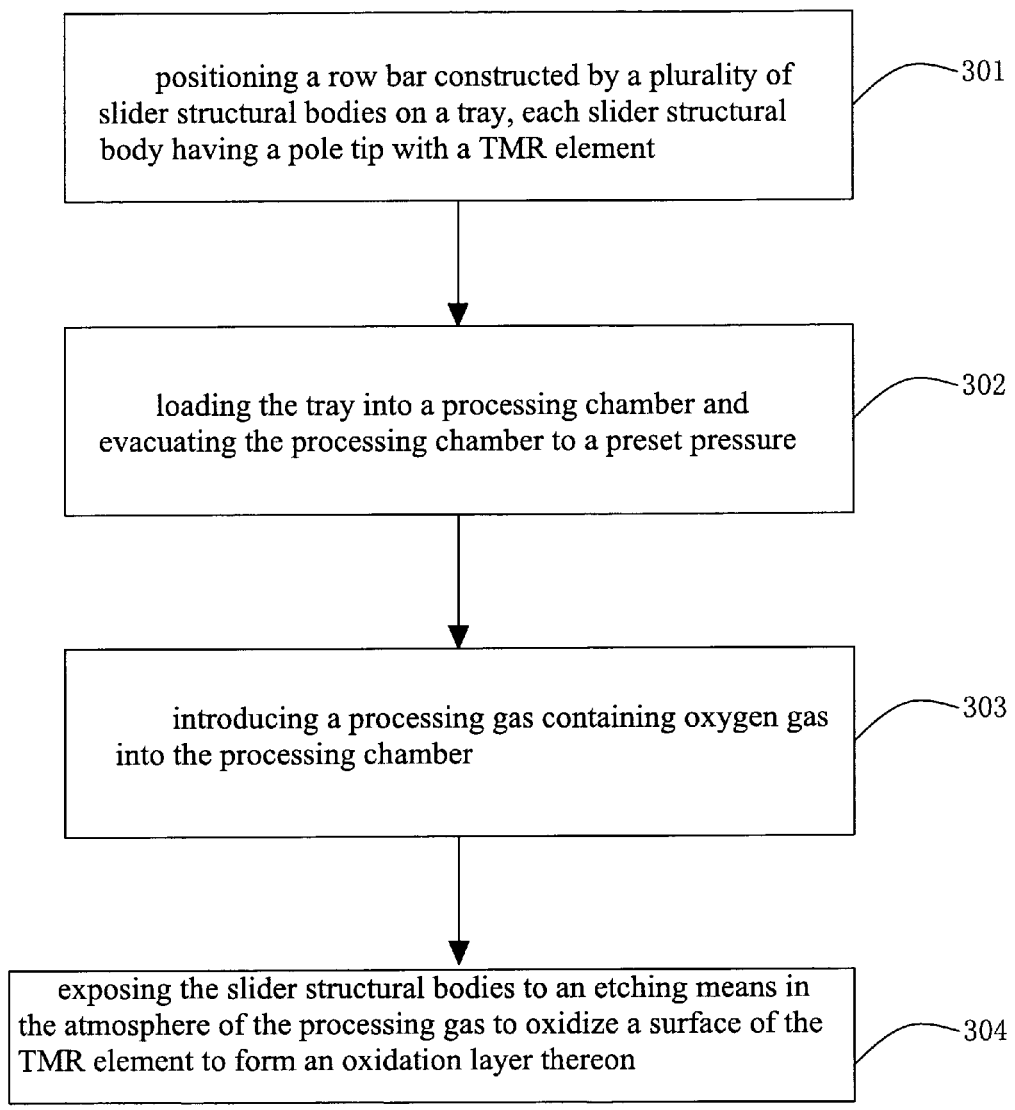
FIG. 2a shows a flowchart illustrating a method for preventing TMR MRR drop of a slider according to one embodiment of the invention.

FIG. 2a shows a flowchart illustrating a method for preventing TMR MRR drop of a slider according to one embodiment of the invention. As illustrated, the method comprises steps of: firstly, positioning a row bar constructed by a plurality of slider structural bodies on a tray, each slider structural body having a pole tip with a TMR element (step 301); then, loading the tray into a processing chamber and evacuating the processing chamber to a preset pressure (step 302); next, introducing a processing gas containing oxygen gas into the processing chamber (step 303); finally, exposing the slider bodes to an etching means in the atmosphere of the processing gas to oxidize a surface of the TMR element to form an oxidation layer thereon (step 304).

Figure 2B:
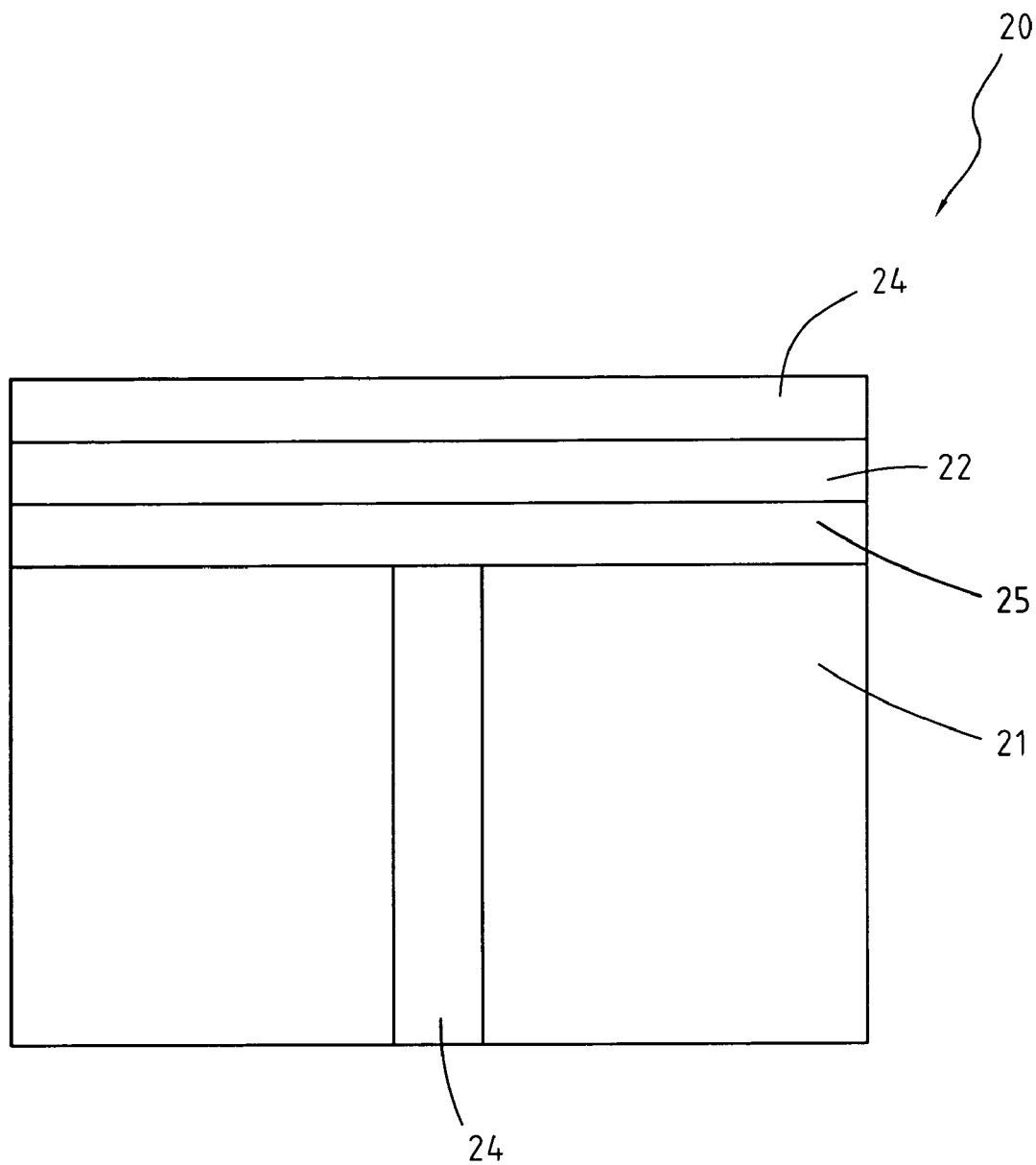
FIG. 2b shows a structure of a TMR element with an oxidation layer formed thereon according to one embodiment of the invention.

FIG. 2b shows a TMR element with an oxidation layer formed thereon using method of the invention. As illustrated, the TMR element 20 comprises two metal layers 21, a TMR barrier layer 24 sandwiched between the two metal layers 21, an oxidation layer 25 covered on the surface of the TMR element 20 (concretely covered on the metal layers and the TMR barrier layer), a silicon layer 22 covered on the oxidation layer 25 and a DLC layer 24. The combination of the silicon layer 22 and the DLC layer 24 is also called as an overcoat. The oxidation layer thus formed may have a thickness ranging between 1.5 nm and 4 nm and preferably is 2 nm. It is proved that the oxidation of this range of thickness can effectively prevent metal material diffusion, and further improve dynamic performance of the slider and read performance of the HDD.

In above oxidation layer forming process, oxygen gas contained in the processing gas oxidizes surface of the metal layer and makes an oxidation layer thereon, therefore, when the overcoat is covered on the surface of the TMR element, no direct contact exists between the metal layers and the silicon layer of the overcoat, thus diffusion of metal material of the metal layers into the silicon layer and further shunting path of the circuitry of the TMR element being obstructed, accordingly, MRR value drop of the TMR element being avoided, hence, dynamic performance of the slider and read/performance of the HDD being maintained well. This MRR drop preventing effect will be illustrated below in conjunction with FIGS. 3a-3b.

Figure 3A:
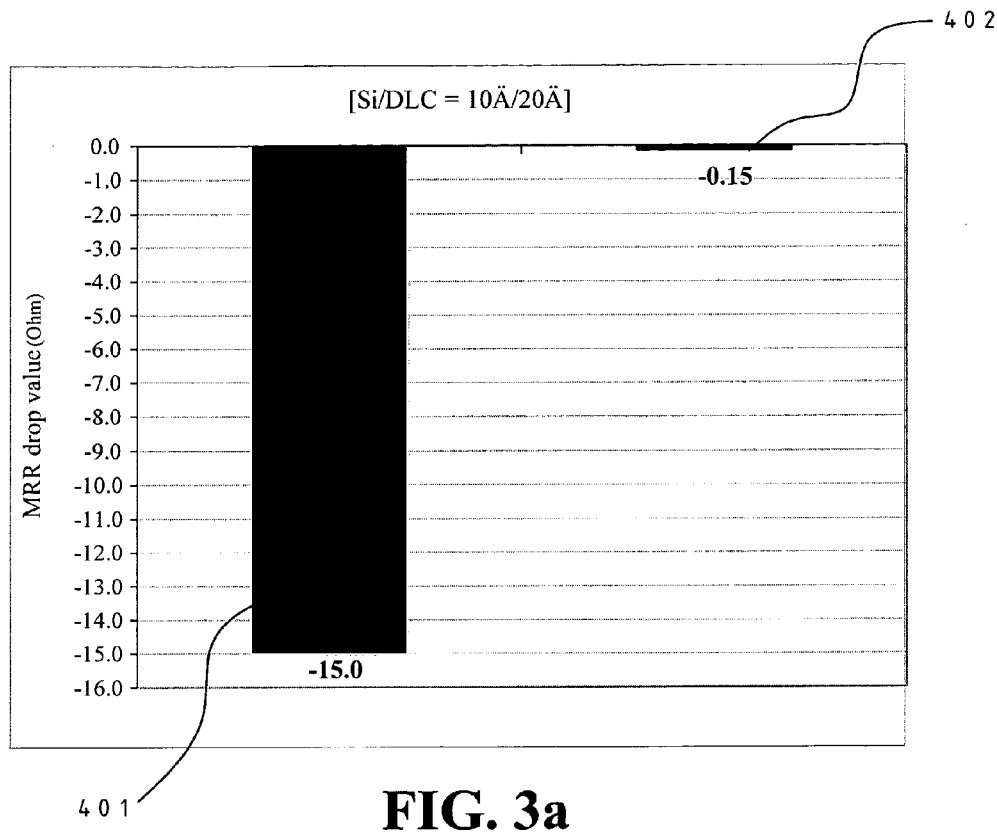
FIG. 3a shows a diagram illustrating MRR drops of a conventional TMR element and a TMR element constructed by the method of the invention.
Figure 3B:
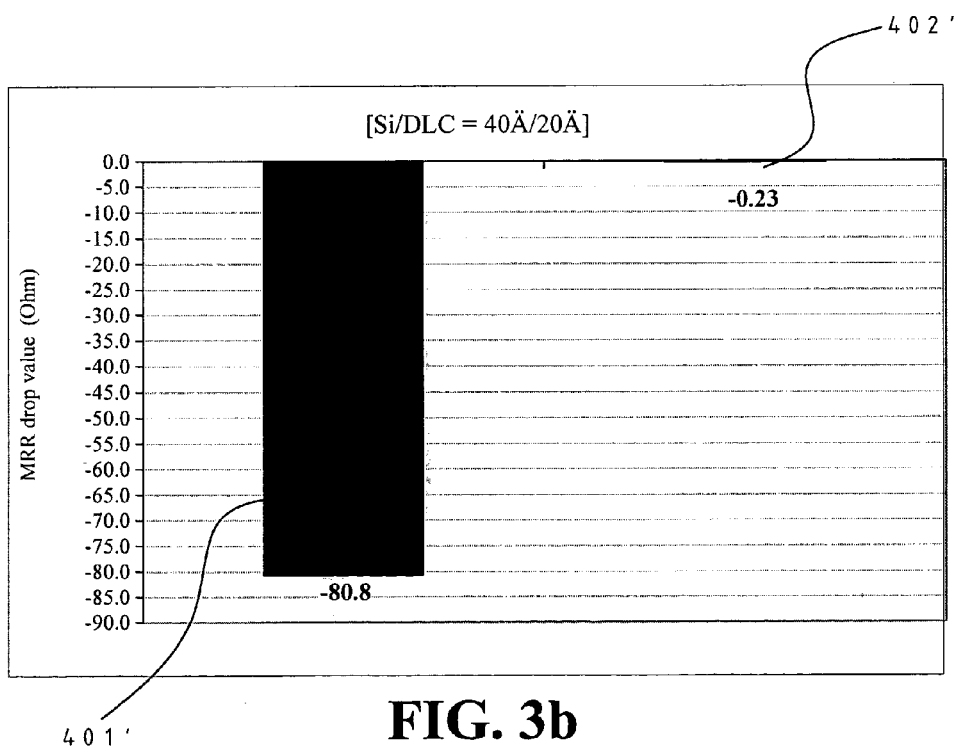
FIG. 3b shows another diagram illustrating MRR drops of a conventional TMR element and a TMR element constructed by the method of the invention.

FIG. 3a shows a diagram illustrating MRR drops of a conventional TMR element and a TMR element constructed by the method of the invention in case where thickness of the silicon layer is 10 angstroms, while the thickness of the DLC layer is 20 angstroms. In the figure, column 401 represents TMR MRR drop of a conventional slider, and column 402 represents TMR MRR drop of a slider of the invention. It is noted from the diagram that the conventional slider, in which no oxidation layer is formed between surface of the TMR element and the silicon layer, suffers a big MRR drop of 15.0 Ohms, while the slider of the invention generates only a very small MRR drop of 0.15 Ohms. Comparatively, since an oxidation layer that serves as a barrier layer is formed between the surface of the TMR element and the silicon layer, the slider constructed by method of the invention endures a very small MRR drop, thus having little negative effect to dynamic performance of the slider and read performance of the HDD. In addition, as shown in FIG. 3b, when a thickness of the silicon layer is increased to 40 angstroms, while the thickness of the DLC layer is still 20 angstroms, the MRR drop (column 401') of the conventional slider rises dramatically to 80.8 Ohms, but the MRR drop (column 402') of the slider of the invention rises only to 0.23 Ohms. That is, with the thickness increasing of the silicon layer, MRR drop preventing effect of the method of the invention becomes more excellent, thereby fine dynamic performance of the slider and read performance of the HDD being realized.

In the method for preventing TMR MRR drop of a slider described above, during oxidation layer forming process, the processing gas containing oxygen gas also etches different materials of surface of the slider with different etching rate, thereby forming micro-texture thereon. More particularly, since the slider structural body is mainly made of AlTiC material (a compound of $Al_2O_3$ and TiC), and oxygen gas etches $Al_2O_3$ more rapidly than TiC, therefore, a clear two-step structure of micro-texture (extruded, island-like TiC grains embedded in $Al_2O_3$ base) is formed on the surface of the slider.

Figure 4:
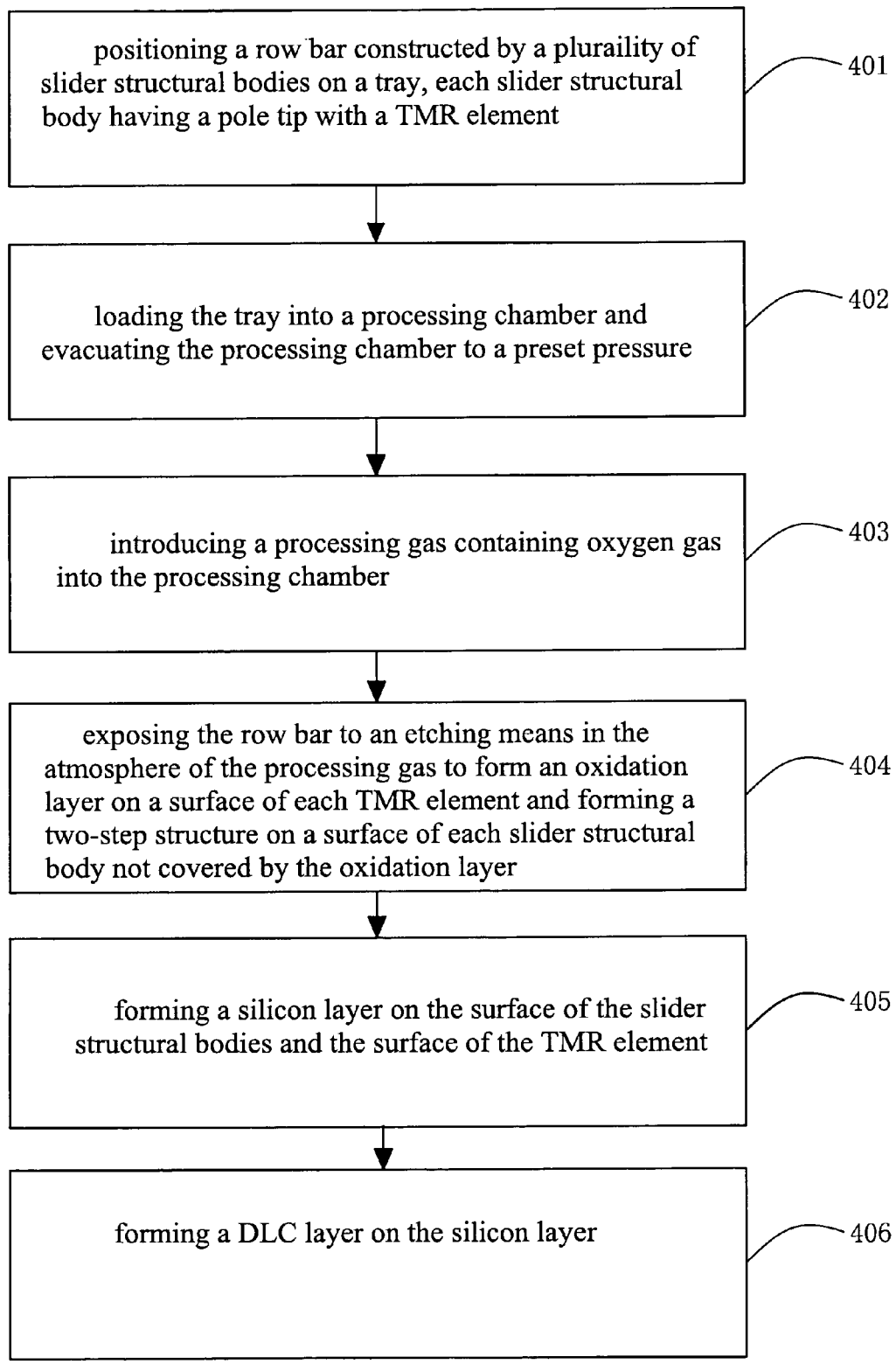
FIG. 4 shows a flowchart illustrating a method for forming micro-texture on a surface of a slider according to one embodiment of the invention.

FIG. 4 shows a flowchart illustrating a method for forming micro-texture on a surface of a slider according to one embodiment of the invention. As illustrated, the micro-texture forming method comprises the steps of: firstly, positioning a row bar constructed by a plurality of slider structural bodies on a tray, each slider structural body having a pole tip with a TMR element (step 401); then, loading the tray into a processing chamber and evacuating the processing chamber to a preset pressure (step 402); next, introducing a processing gas containing oxygen gas into the processing chamber (step 403); after that, exposing the row bar to an etching means in the atmosphere of the processing gas to form an oxidation layer on a surface of each TMR element and forming a two-step structure on a surface of each slider structural bodies not covered by the oxidation layer (step 404); forming a silicon layer on the surface of the slider structural bodies and the surface of the TMR element (step 405); and finally forming a DLC layer on the silicon layer (step 406) to finish the whole process.

In the embodiment described above, the processing gas may be a pure gas of oxygen gas or a mixture of oxygen gas and inert gas such as Argon, Neon, Xenon, Helium, or Krypton gas. The inert gas helps to achieve clearer micro-texture for the slider. In one embodiment, the grain size of island-like TiC grains is around 1 micron.

Figure 5:
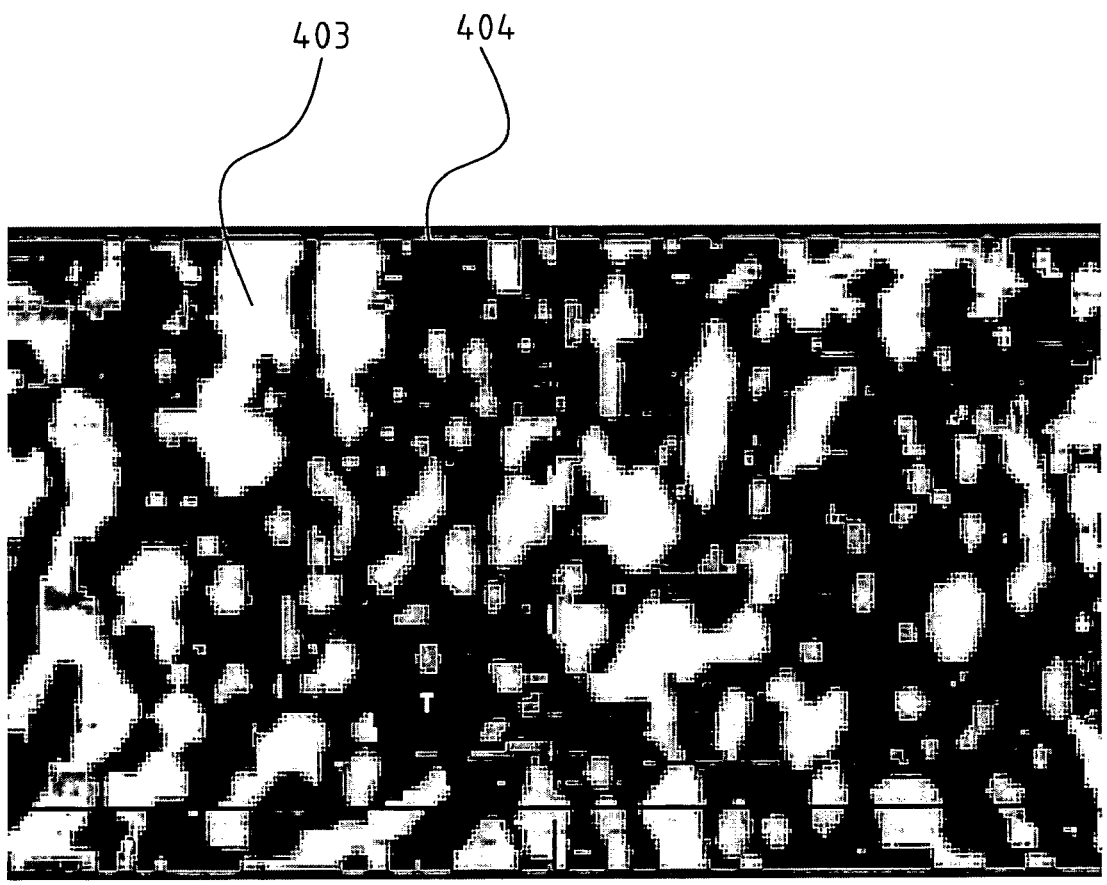
FIG. 5 shows a morphology phase of the micro-texture formed by micro-texture forming method of the invention.

Referring to FIG. 5, a morphology phase of the micro-texture formed on the surface of the slider is shown. The black area designated by numeral 404 is $Al_2O_3$ base and white area designated by numeral 403 is extruded island-like TiC grain.

An Atomic Force Microscope (AFM) may be used to measure the micro-texture height. Usually, a 20 μm square area is scanned, and a flattening method may be used to eliminate cantilever bow effect of the atomic force microscope. In addition, for obtaining better height characteristic, a bearing method may be used to get the micro-texture height in consideration of the average of whole measured area.

Figure 6A:
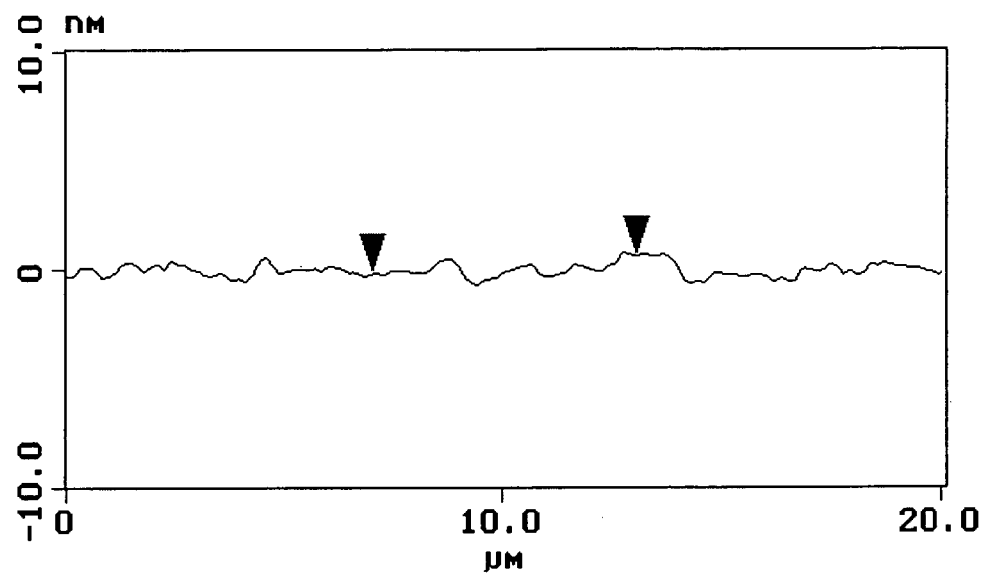
FIG. 6a shows a sectional scanning view of a surface of a slider before it is etched by processing gas.
Figure 6B:
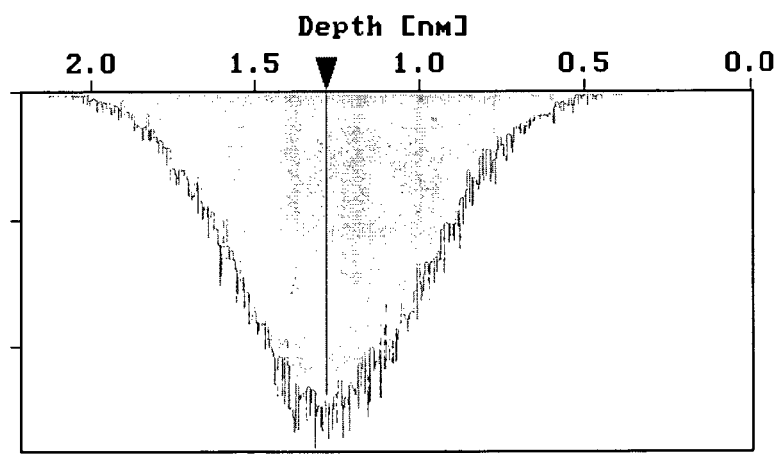
Figure 7A:
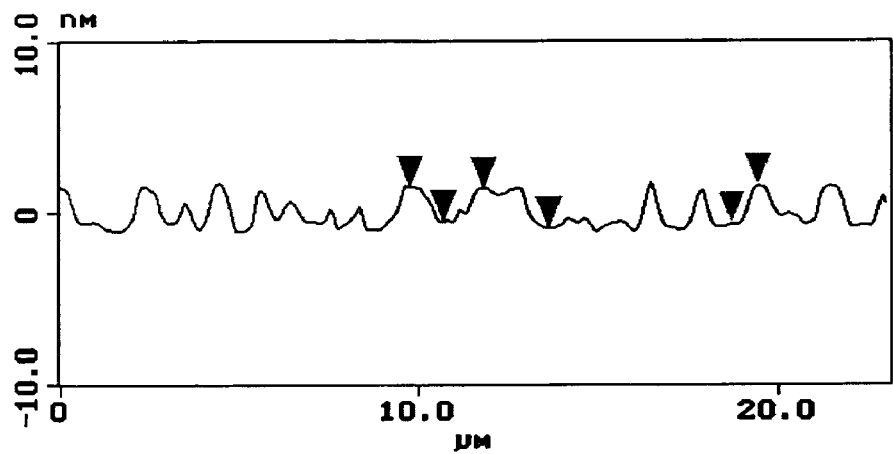
FIG. 7a shows a sectional scanning view of a slider surface after it is etched by processing gas for 20 seconds.
Figure 7B:
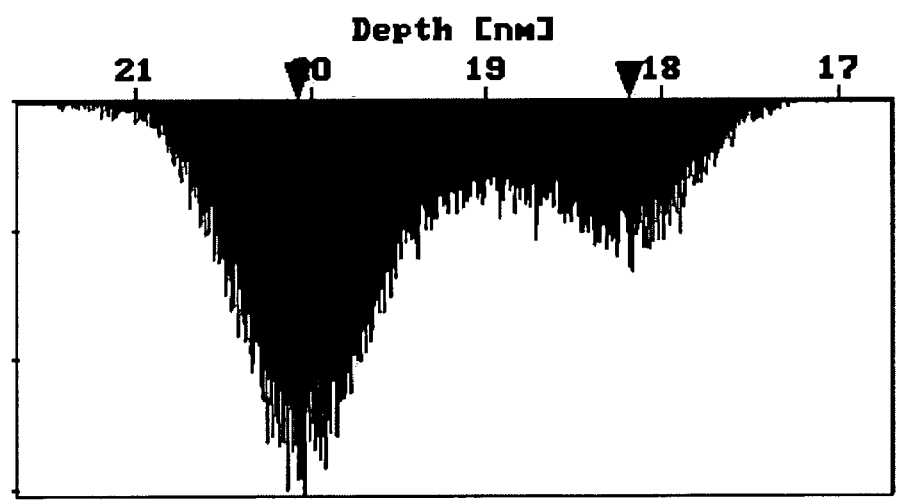
Figure 8A:
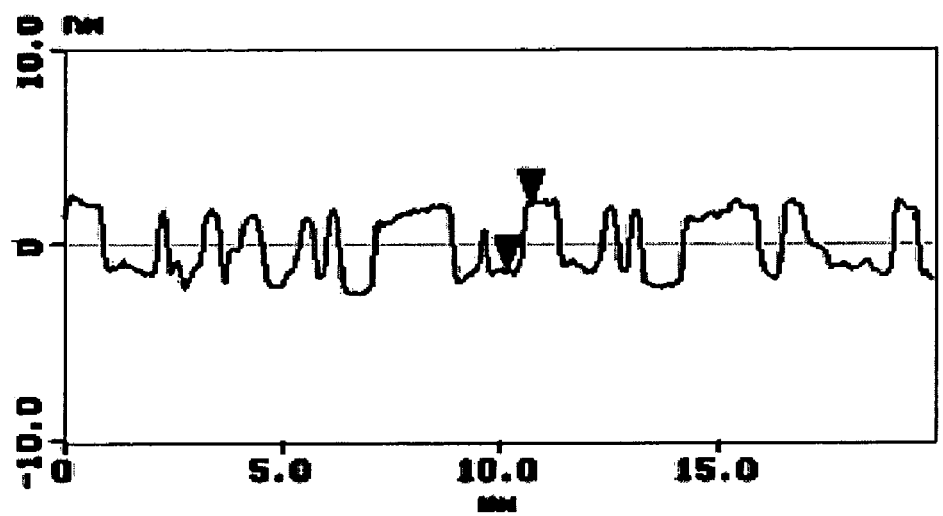
FIG. 8a shows a sectional scanning view of a slider surface after it is etched by processing gas for 40 seconds.
Figure 8B:
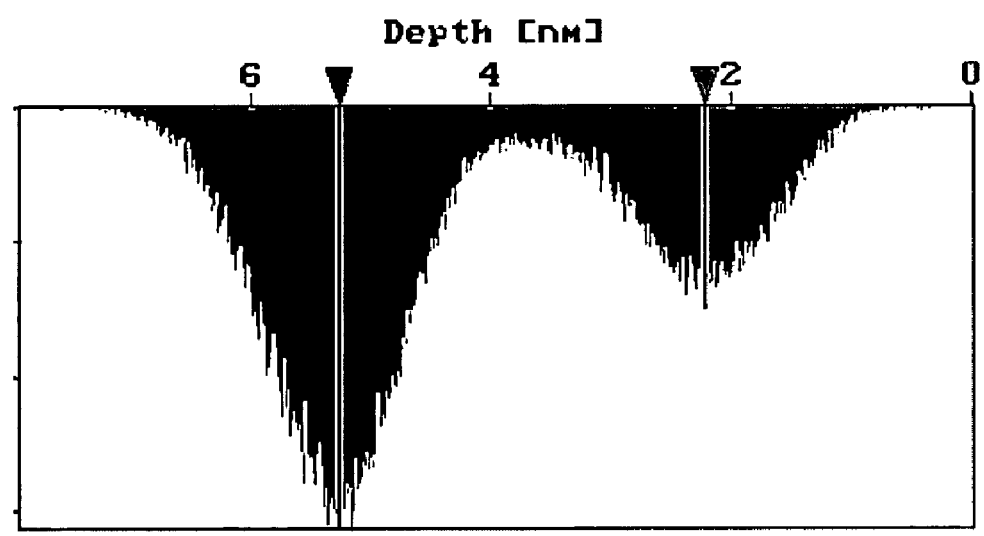
Figure 9A:
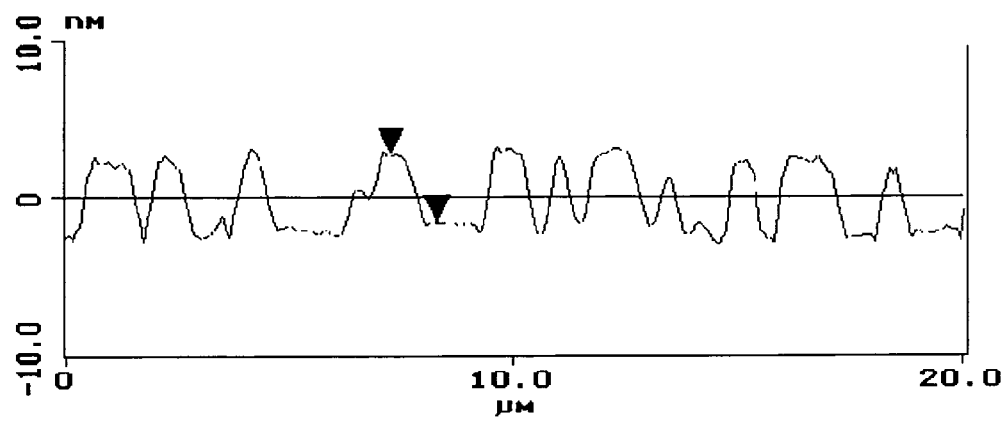
FIG. 9a shows a sectional scanning view of a slider surface after it is etched by processing gas for 60 seconds.
Figure 9B:
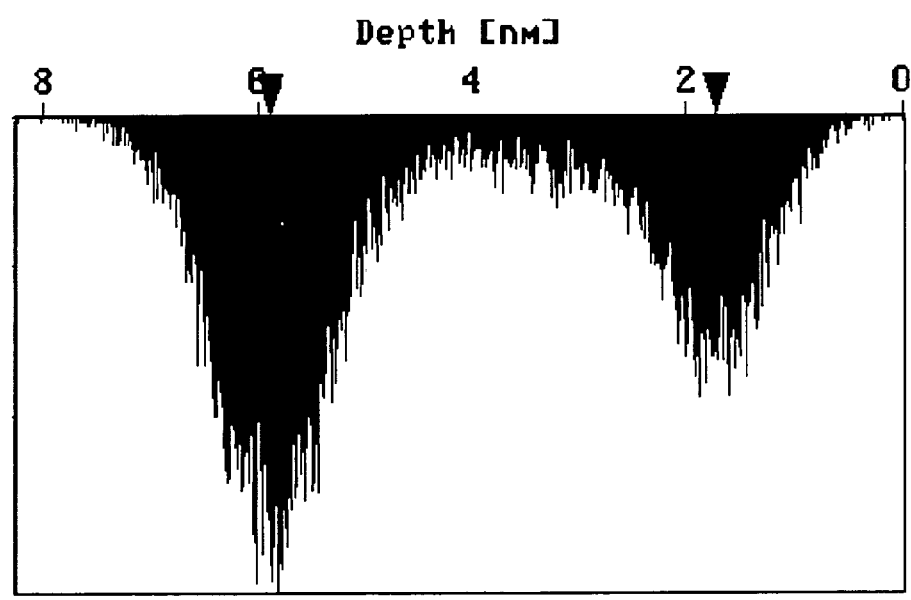

Now referring to FIG. 6a, when the slider is not etched by the micro-texture forming method of the invention, no clear two-step structure is formed on the slider surface. This is because before the slider is etched to form micro-texture, a lapping process is usually performed, and this lapping process removes $Al_2O_3$ base and TiC with almost the same removing rate. Correspondingly, referring to FIG. 6b, in which micro-texture height distribution status is shown, most micro-texture height is less than 1 nm. When the slider surface is etched for 20 seconds, as shown in FIGS. 7a-7b, most micro-texture height is about 2 nm. Similarly, as shown in FIGS. 8a-8b, when etching time is 40 seconds, most micro-texture is about 3 nm, and when etching time is increased to 60 seconds, most micro-texture attains a height of 4 nm. That is, the micro-texture forming method of the invention provides a micro-texture with a clear two-step structure and the step height or the micro-texture height is dependent upon the processing time.

Figure 10A:
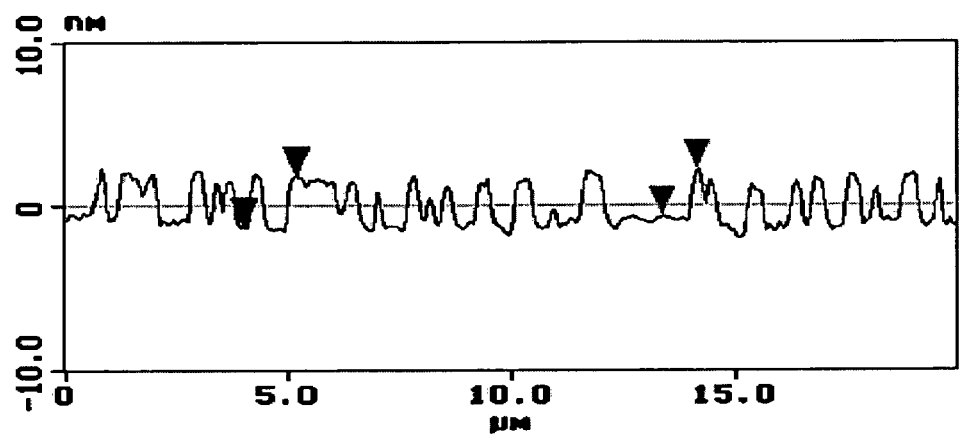
FIG. 10a shows a sectional scanning view of a slider surface when size of TiC grains is changed.
Figure 10B:
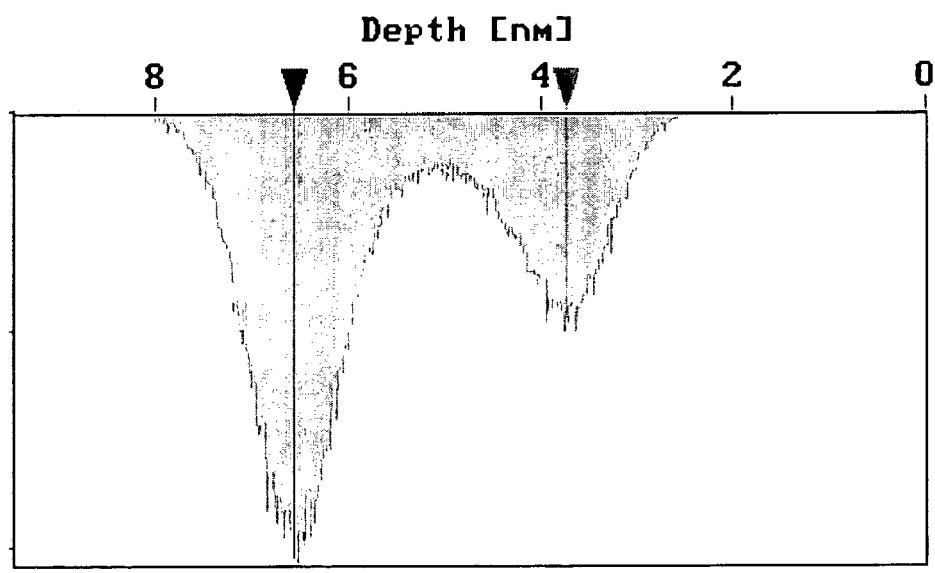

In a modified embodiment of the invention, size of the TiC grains may be changed and similar effect can also be obtained, i.e., clear two-step structure (as shown in FIGS. 10a-10b) can also be formed on the surface of the slider, while only difference is density of island-like TiC grains.

The height of the micro-texture affects the touch-down and take-off performance of the slider. This is clearly observed from the following table.

| Item | micro-texture height (nm) | touch down (atm.) | take off (atm.) |
| --- | --- | --- | --- |
| 1 | <1 | 0.60 | 1.00 |
| 2 | 2 | 0.55 | 0.66 |
| 3 | 3 | 0.58 | 0.69 |
| 4 | 4 | 0.57 | 0.72 |

In above table, touch down (atm.) means the maximum pressure at which the slider can touch the magnetic disk, and take off (atm.) means the minimum pressure at which the slider can take off from the magnetic disk. Lower volume and lower difference between touch down and take off shows better performance stability for the slider. It is clear from the table that with increase of the micro-texture height, both touch down and take off parameters of the slider are decreased and difference between the touch down and take off parameter is also reduced clearly. In other word, the performance such as flying performance and dynamic performance of the slider becomes more stable.

In silicon layer and DLC layer forming steps of the micro-texture forming method described above, chemical vapor deposition (CVD), ion beam deposition (IBD), and filtered cathodic arc (FCA) methods are commonly employed. In common for theses process, three steps are involved in the formation of the overcoat, including pre-cleaning, silicon layer coating, and diamond-like carbon (DLC) coating.

More particularly, a slider to be processed is often cleaned in the atmosphere and is then loaded into a vacuum chamber, which is then evacuated. The surface of the slider to be processed normally absorbs moisture, carbon dioxide, and even organic solvent used to clean the slider in atmosphere. In the pre-cleaning step, plasma etching or ion beam etching with oxygen gas or a mixture of oxygen gas and noble gas, such as argon, is employed to remove the surface contamination from the slider to be processed. With the etching process, a very small amount of material is removed from the surface of the slider and no significant change of the surface roughness occurs. In other words, the surface roughness, Ra, of the slider still remains about 0.3 nm.

Once the pre-cleaning is done, an adhesion layer (or named silicon layer) is coated on the processed surface of the slider. Preferably, the adhesion layer is formed with silicon, which helps growing DLC thereon. In addition, in the DLC coating step, methane or ethylene is used as precursor for CVD and IBD process, while pure graphite cylinder is used as FCA target.

The micro-texture forming method of the invention described above is carried on in the pre-cleaning process, and this can be done with the original facility at the expense of a slight increase of process lead time, which makes the process of the present invention very practical. The micro-texture forming method can be employed with several regular processes, including plasma etching process and ion beam etching, which will be separately described hereinafter.

Figure 11A:
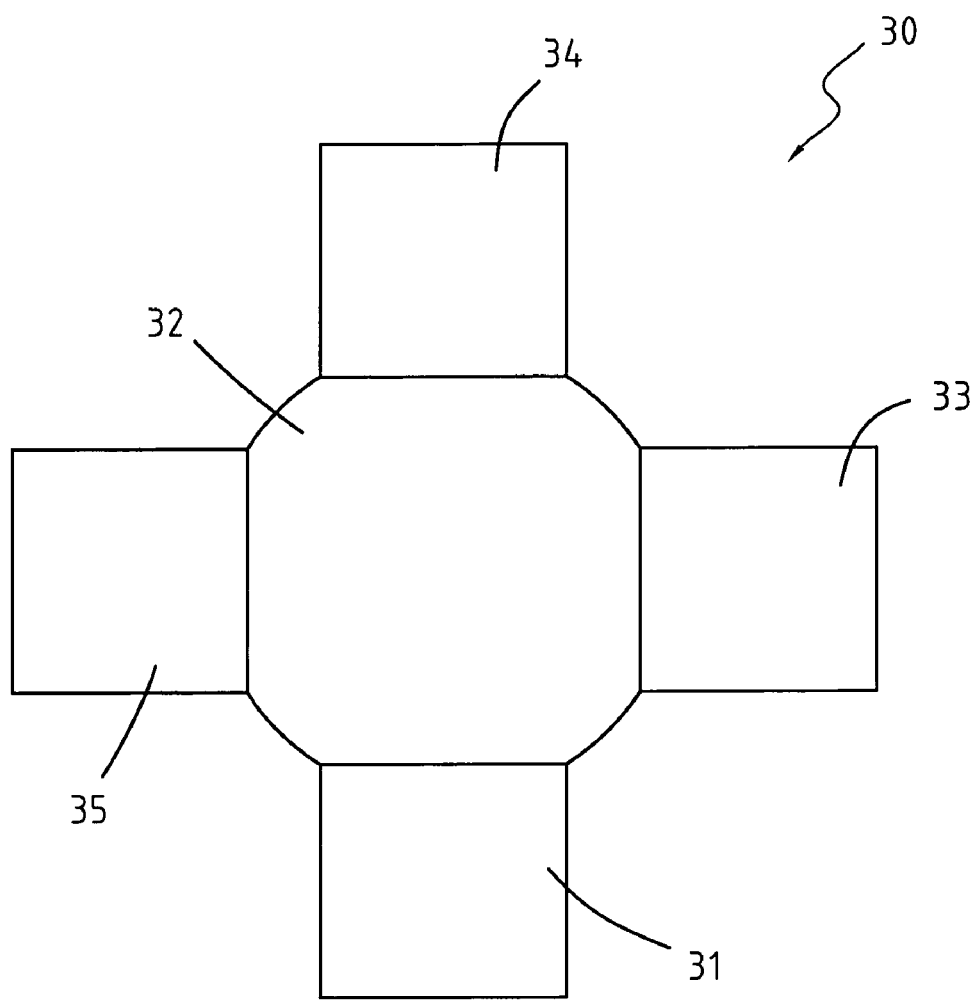
FIG. 11a schematically shows a block diagram illustrating main structure of an equipment used in method for forming micro-texture on one surface of a slider according to one embodiment of the invention.

Referring to FIG. 11a, which shows a block diagram illustrating main structure of an equipment used in the method for forming micro-texture on the surface of a slider according to one embodiment of the invention, a plurality of sliders, which are arranged in arrays, also referred to as row bars, are fixed in a tray and then, the tray is loaded into the equipment 30 through a loading/unloading port 31. Next, the tray is moved from the loading/unloading port 31 to a vacuum transfer chamber 32 of the equipment 30. Thereafter, the vacuum transfer chamber 32 is pumped down to a preset pressure and then the tray is moved into a plasma etching chamber 33.

To start the plasma etching process, the plasma etching chamber 33, with the tray received therein, is pumped down to a preset pressure, and a processing gas, such as oxygen or an oxygen-noble gas mixture, is introduced into the plasma etching chamber 33 via a mass flow controller (MFC) valve (not shown). After the introduction of the process gas, plasma is ignited. Several ways can be used to generate plasma. The most widely used is directly capacitance coupled plasma and inductive coupled plasma using a radio frequency power. However, some newly developed methods can use electro-cyclotron resonance enhanced microwave source to generate plasma. In the present invention, the key point for forming the micro-texture is to adjust substrate bias. The capacitance coupled plasma has a self bias on the substrate, but for the other methods, an additional power must be applied to the substrate to provide the substrate bias.

The plasma is set off after the elapse of a preset time period. The setting of time is dependent upon a desired height of the micro-texture formed on the slider.

Thereafter, the tray is moved to a silicon coating chamber 34 in which a layer of silicon is sputter-coated on the surface of the slider. The tray is then transferred to an a-C:H/ta-C (amorphous carbon with hydrogen/tetrahedral carbon) coating chamber 35 in which a layer of DLC is deposited on the surface of the slider to a desired thickness.

Critical factors that affect the plasma etching process include type of process gas, pressure of process chamber, etching power and etching time. The process gas used in the plasma etching process in accordance with the present invention to get a bigger selectivity of $Al_2O_3$ to TiC is oxygen, or a mixture of oxygen and noble gas(s). In the invention, oxygen has a faster etching rate for $Al_2O_3$ and a slower rate for TiC. Flow rate of the process gas is controlled by the MFC to reach to a desired pressure, where the pressure of the process chamber is set to 1.0 Pa for the operation of the process.

Electrical power required for carrying out the present inventive process is adjusted in accordance with the equipment configuration to generate plasma in the plasma etching process and to provide a bias on the slider to be processed. In an embodiment of the present invention, a bias of 300V DC is applied to the slider. The purpose of the bias is to make physical etching of oxygen dominant.

Etching time is set in accordance with the desired step height of the micro-texture. Normally, for micro-texture having a step height of about 4 nm, the etching time is set to about five minutes.

Figure 11B:
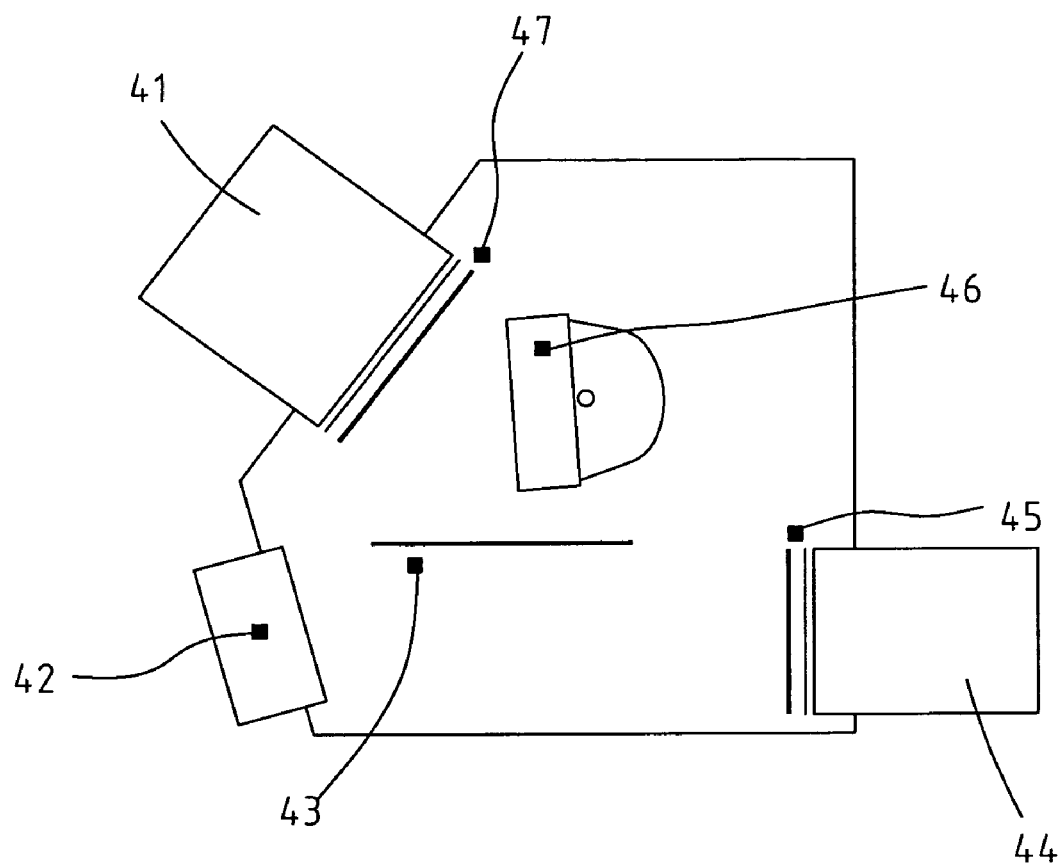
FIG. 11b schematically shows a block diagram illustrating main structure of an equipment used in the method for forming micro-texture on one surface of a slider according to another embodiment of the invention.

In another embodiment, the micro-texture forming method of the invention may be implemented by ion beam etching (IBE) to replace the plasma etching discussed above. The equipment for carrying out the IBE process is shown in FIG. 11b. The process for forming micro-texture on the slider with ion beam etching starts from loading a tray that carries a plurality of sliders, which are arranged in arrays, into a vacuum process chamber (not labeled) and fixing the tray with a product holder 46, which is operable to tilt between 0-90 degrees. The chamber is then pumped down to a preset pressure.

After that, process gas, such as oxygen or a mixture of oxygen and noble gas, is introduced into a first ion source 41, which is separated from the product holder 46 by a first shutter 47. Then, neutralizer and plasma inside the ion source 41 is ignited. After a certain period after the ignition, the plasma gets stable.

Once the plasma becomes stable, the product holder 46 is tilted to a preset angle and the shutter 47 is opened to allow the plasma to bombard the sliders fixed on the tray for carrying out pre-cleaning operation for the sliders. Internal pressure inside the process chamber at this moment is about 0.03-0.05 Pa.

After a given period of time elapse from the opening of the shutter 47, the shutter 47 is closed again and power to the ion source 41 and the neutralizer is shut down. The process chamber is once again evacuated and the tray tilted to another preset direction and processed by a combination of a second ion source 44, which is shuttered by a second shutter 45 and a silicon target 42 that is shielded from the product holder 46 by a third shutter 43. A silicon layer is thus formed on the sliders.

Thereafter, the tray is tilted back to the first ion source 41. However, the source gas for the first ion source 41 is changed to $C_2H_4$ for forming a C:H coating. The processing time of this period is determined by the desired thickness of the C:H coating and the deposition rate of layer.

Critical factors that affect the micro-texture formed by ion beam etching include: type of process gas, incidence angle of ion beam, etching power and etching time. The process gas used in the ion beam etching process in accordance with the present invention for getting a bigger selectivity of Al2O3 to TiC is oxygen, or a mixture of oxygen and noble gas(s). Adjusting ion beam incidence angle is needed when the pole tip recess of the magnetic slider is a concern. Pole tip material and surface morphology before pre-cleaning is a main concern to adjust the incidence angle to meet the desired pole tip morphology.

Figure 1C:
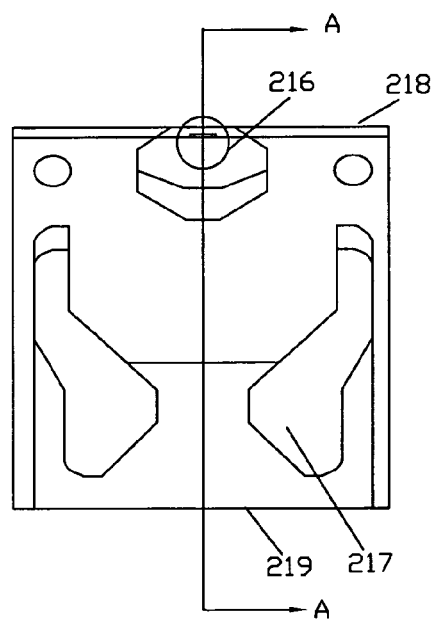
FIG. 1c is a top plan view of the slider shown in FIG. 1b.
Figure 1D:
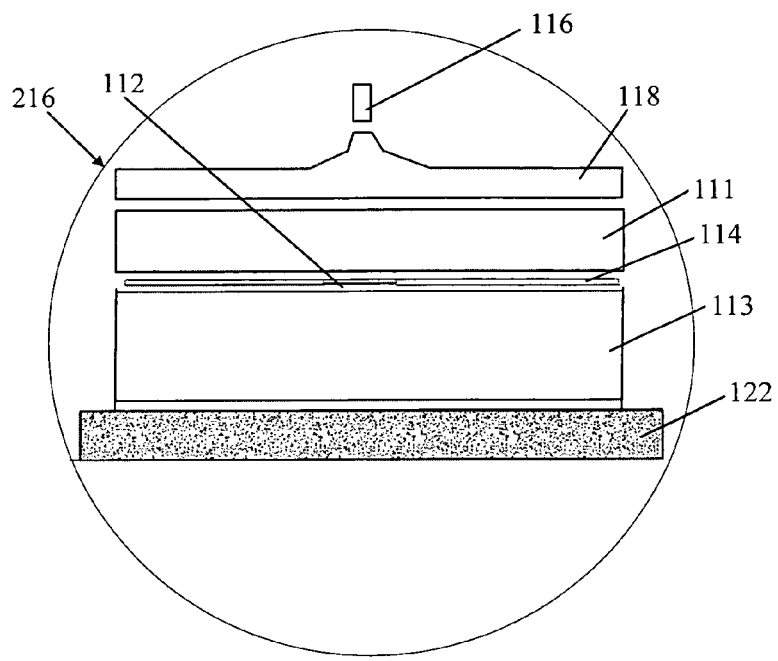
FIG. 1d is a partial, enlarged view of a pole tip shown in FIG. 1c.
Figure 1E:
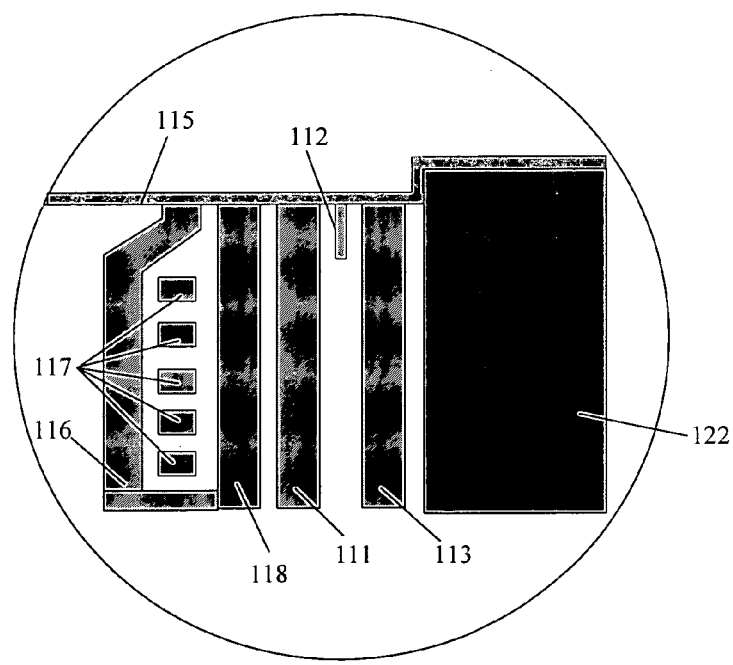
FIG. 1e is a partial, cross-sectional view of the structure shown in FIG. 1d along A-A line thereof.
Figure 1F:
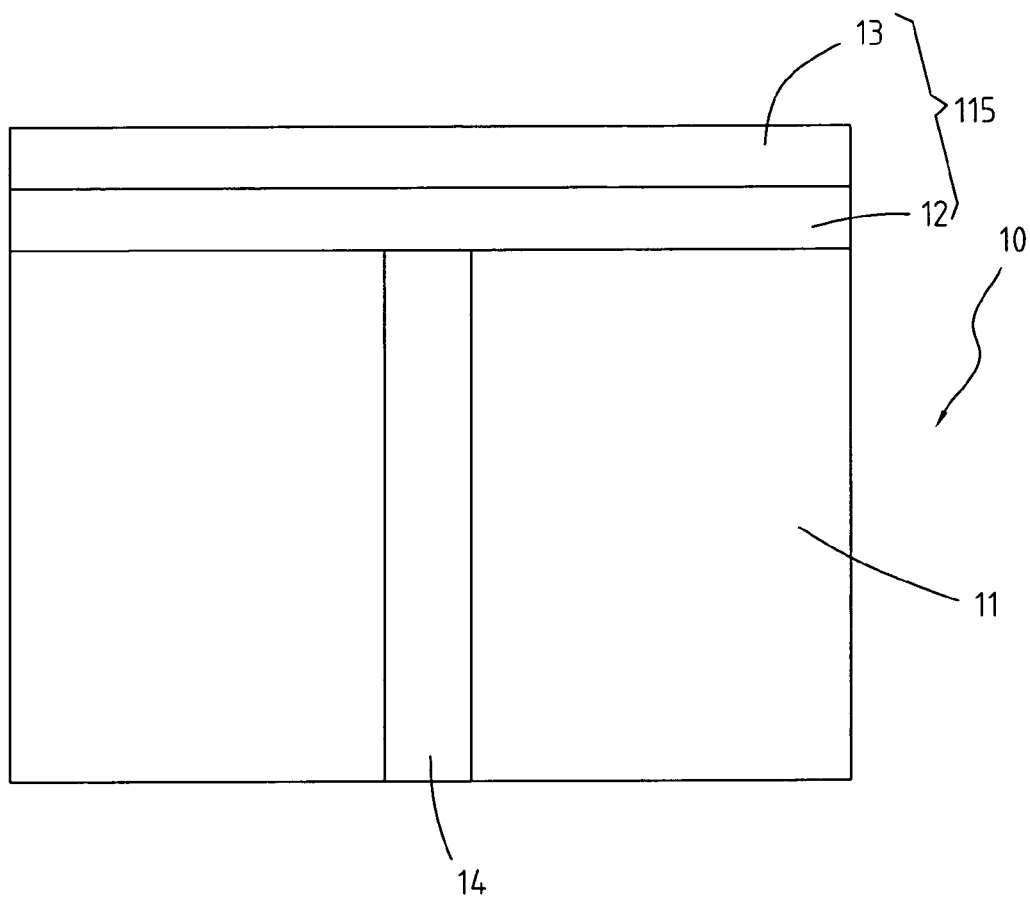
FIG. 1f shows a structure of a conventional TMR element.
Figure 12A:
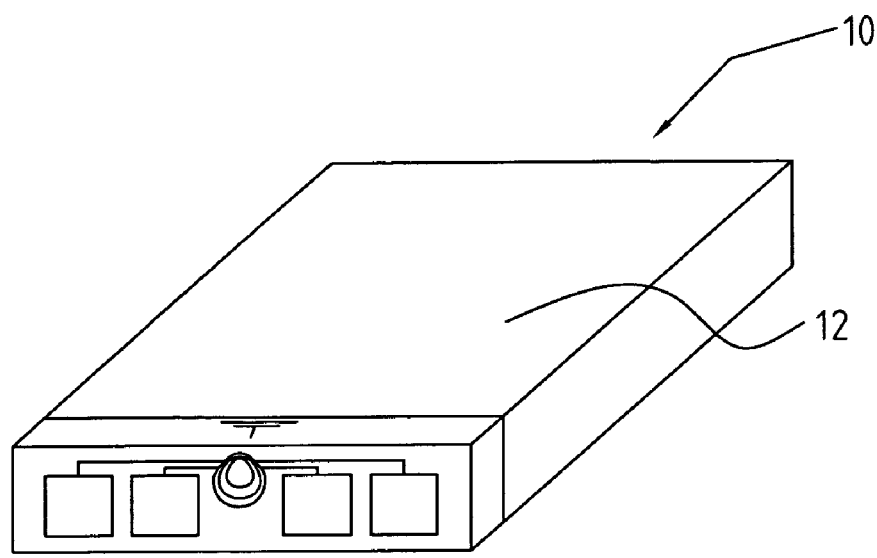
FIGS. 12a-12c show sequential views illustrating a process of forming a micro-texture on one surface of a slider according to one embodiment of the invention.
Figure 12B:
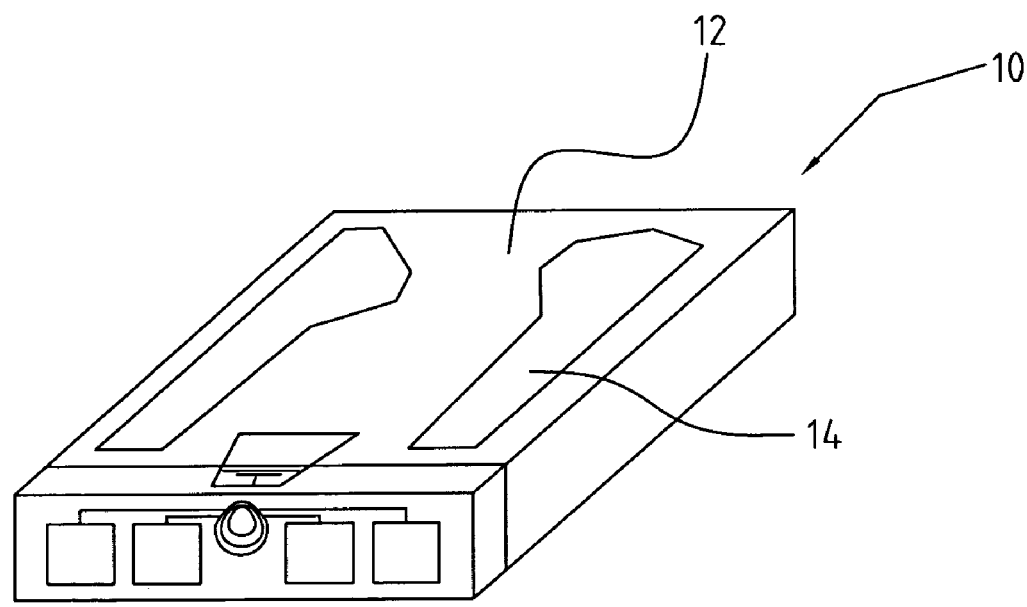
Figure 12C:
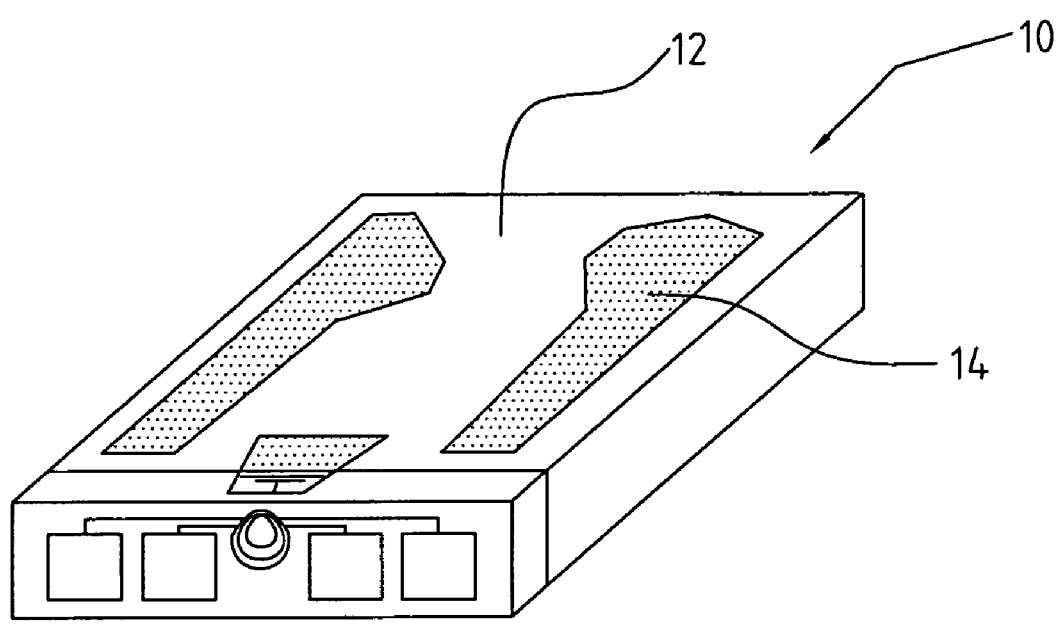

FIGS. 12a-12c show another method for forming micro-texture on a surface of a slider according to another embodiment of the invention. Firstly, the surface 12 is processed by fine lapping and becomes smooth with a surface roughness (Ra) of 0.2-0.4 nm, as shown in FIG. 12a. The lapped surface 12 is then covered with a protection layer, referred to as diamond-like carbon (DLC) layer. The surface 12 is then subject to a series of processing, including photolithography and ion etching, which forms air bearing surface (ABS) pattern 14 on the surface 12 for airflow and pressure control. Then, as shown in FIG. 1c, micro-texture in hatch, is then formed on the surface 12.

Figure 13A:
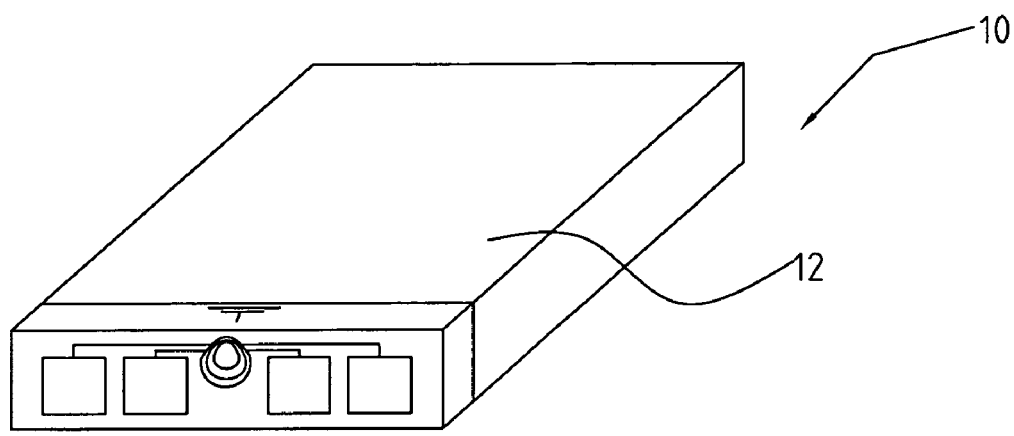
FIGS. 13a-13c show sequential views illustrating a process of forming a micro-texture on one surface of a slider according to another embodiment of the invention.
Figure 13B:
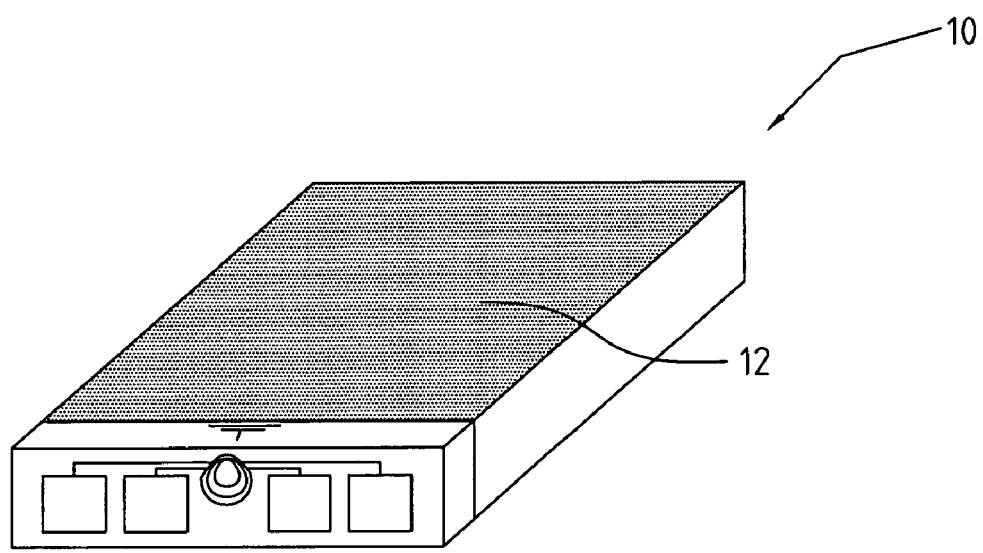
Figure 13C:
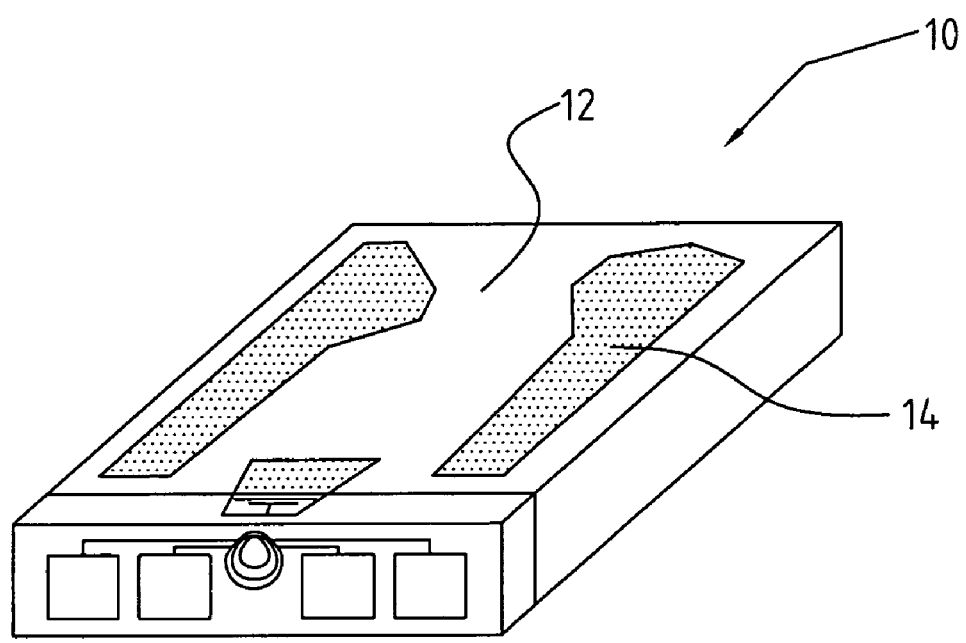

Alternatively, as shown in FIGS. 13a-13c, the surface 12 of the slider 10, after being lapped and coated with DLC layer (FIG. 13a) is processed to form micro-texture, shown in hatch in FIG. 13b. Thereafter, as shown in FIG. 13c, air bearing surface (ABS) pattern 14 is formed on the surface 12.

Photo masks, including positive photo resist and negative photo resist, can be employed during the formation of the micro-texture to protect specific areas, such as magnetic pole tip, of the surface 12, whereby no micro-texture is formed on the specific areas.

Figure 14:
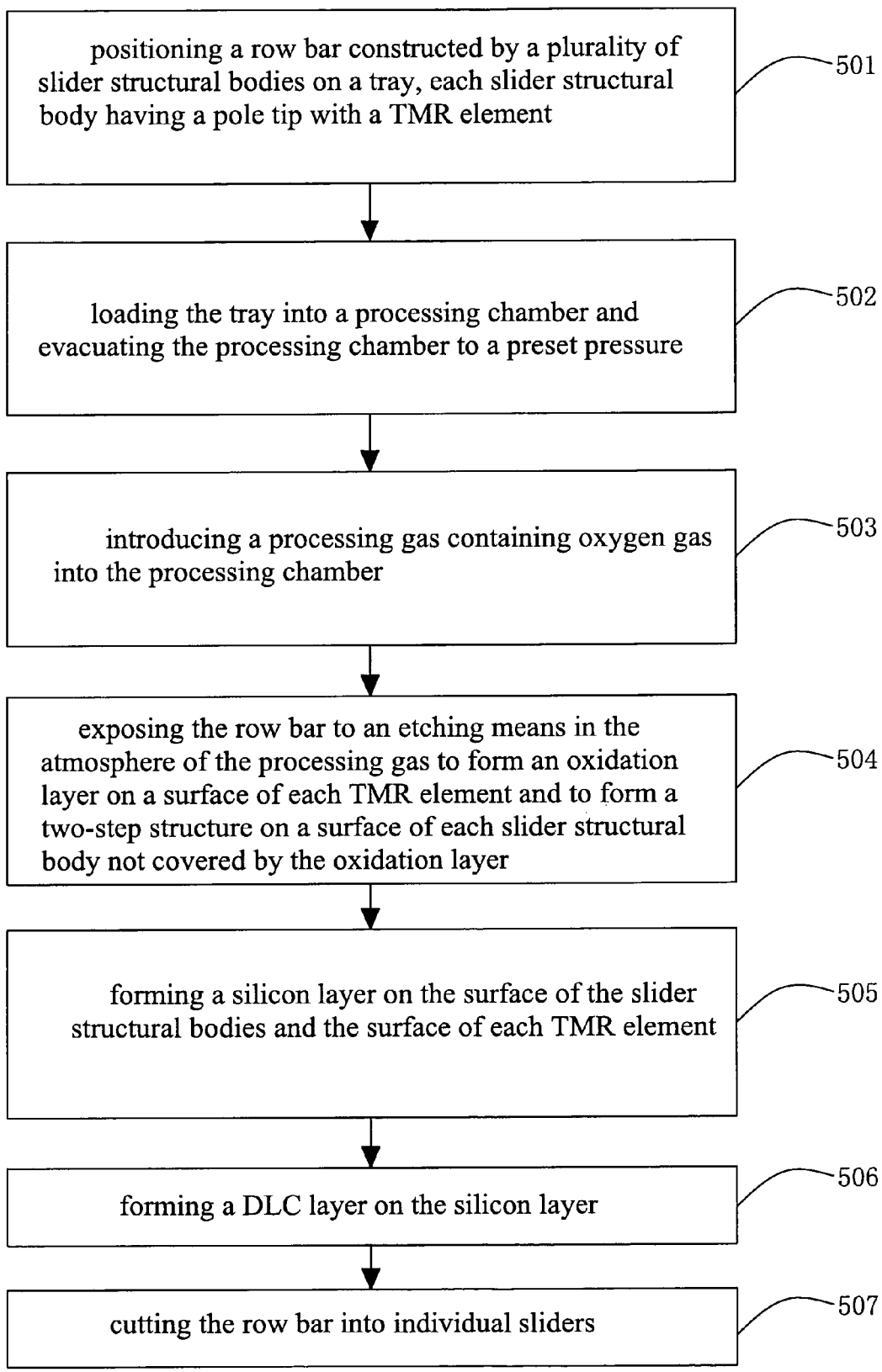
FIG. 14 shows a flowchart illustrating a slider manufacturing method according to one embodiment of the invention.

Referring to FIG. 14, a slider manufacturing method is illustrated. Firstly, positioning a row bar constructed by a plurality of slider structural bodies on a tray, each slider structural body having a pole tip with a TMR element (step 501); then, loading the tray into a processing chamber and evacuating the processing chamber to a preset pressure (step 502); next, introducing a processing gas containing oxygen gas into the processing chamber (step 503); after that, exposing the row bar to an etching means in the atmosphere of the processing gas to form an oxidation layer on a surface of each TMR element and forming a two-step structure on a surface of each slider structural bodies not covered by the oxidation layer (step 504); next, forming a silicon layer on the surface of the slider structural bodies and the surface of each TMR element (step 505); forming a DLC layer on the silicon layer (step 506); and finally cutting the row bar into individual sliders (step 507) to finish the whole process.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for reducing TMR (tunnel magneto-resistance) MRR (magneto-resistance resistance) drop of a slider, the method comprising:

positioning a row bar constructed by a plurality of slider structural bodies on a tray, each slider structural body having a pole tip with a TMR element;

loading the tray into a processing chamber and evacuating the processing chamber to a preset pressure;

introducing a processing gas containing oxygen gas into the processing chamber;

exposing the slider structural bodies to an etching means in the atmosphere of the processing gas to oxidize two metal layers of the TMR element to form an oxidation layer directly thereon;

forming a silicon layer on the oxidation layer; and forming a diamond-like carbon layer on the silicon layer.

2. The method according to claim 1, wherein the oxidation layer has a thickness ranging between 1.5 nm and 4 nm.

3. The method according to claim 2, wherein the oxidation layer has a thickness of 2 nm.

* * * * *